Oct. 10, 1961     D. W. SHERMAN     3,003,811
METHOD AND APPARATUS FOR MOUNTING A VEHICLE BODY TO ITS FRAME
Filed Sept. 25, 1958     2 Sheets-Sheet 1

INVENTOR.
DONALD W. SHERMAN
BY
Andrews & Starke
Attorneys

Oct. 10, 1961 D. W. SHERMAN 3,003,811
METHOD AND APPARATUS FOR MOUNTING A VEHICLE BODY TO ITS FRAME
Filed Sept. 25, 1958 2 Sheets-Sheet 2
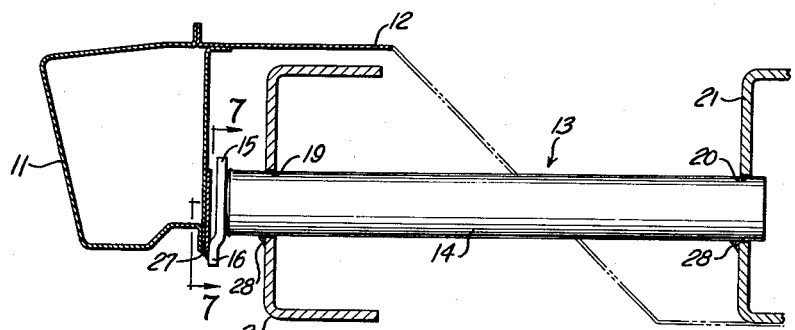
FIG. 5.
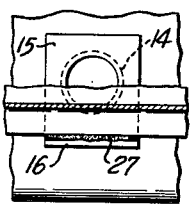
FIG. 7.
FIG. 6.
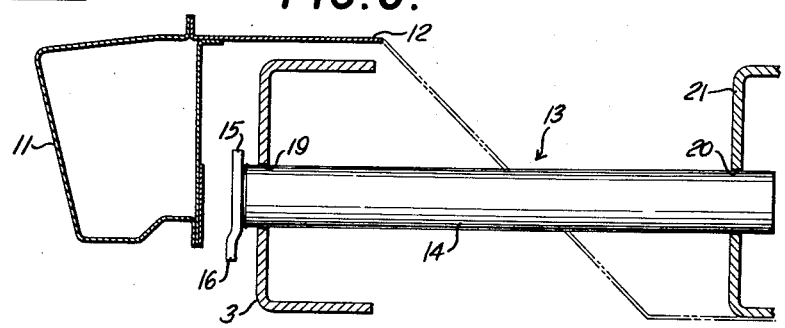
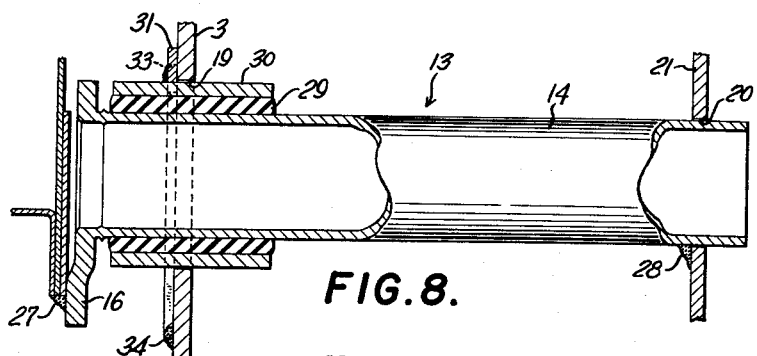
FIG. 8.
FIG. 9.
INVENTOR.
DONALD W. SHERMAN
BY
Andrus & Starke
Attorneys

United States Patent Office 3,003,811
Patented Oct. 10, 1961

3,003,811
METHOD AND APPARATUS FOR MOUNTING A VEHICLE BODY TO ITS FRAME
Donald W. Sherman, Milwaukee, Wis., assignor to A. O. Smith Corporation, Milwaukee, Wis., a corporation of New York
Filed Sept. 25, 1958, Ser. No. 763,244
15 Claims. (Cl. 296—35)

This invention relates to a method and apparatus for mounting a vehicle body to its frame.

Through the years it has been customary to employ a narrow frame provided with a number of overhanging body brackets to which the body is mounted and secured by means of vertically disposed bolts together with rubber pads and washers. The location of body brackets has generally been determined by trial and error, and since frame and body dimensions are not precise shims must be used to provide proper alignment. The securement is generally made through the shallow body floor cross members and at a substantial distance inward from the body sill. Not only does this attachment prevent lowering of the floor to obtain adequate seating with a low silhouette, but it also transmits high frequency vibrations directly to the body floor which is well-suited for noise generation.

Furthermore, laboratory tests show that for vertical static test loads applied to a vehicle having a conventionally mounted body to reasonably accurately represent the vehicle's load condition at the curb, the body sides deflect considerably more than the frame. These loads, of course, are magnified when driving over uneven road surfaces. The difference in deflection between body sides and frame represents deflection of floor and frame body brackets and twisting of the frame rails and indicates considerable structural inefficiency.

In recent years several versions of a wide frame comprising outwardly curved one-piece side rails have been introduced. These frames would appear to be somewhat of an improvement over the narrow frame in that they permit partial lowering of the floor to provide better seating accommodation, and because of their width there is lesser deflection differential between frame and body due to overhanging body loads imposing twist at the mid-section of the rails. However, body brackets continue to be employed with these frames together with the usual vertical bolts which extend through the floor of the body or through brackets secured to the floor.

If a vehicle frame and body are fastened together effectively, their composite rigidity should be considerably greater than the sum of their individual rigidities. The differences in deflection between frame and body noted above would seem to indicate that greater structural efficiency can be derived from more suitable interconnecting means and the location of such means. It is an object of this invention, therefore, to provide improved interconnecting means and to so locate such means to to promote greater structural efficiency between frame and body.

As noted hereinbefore, frame and body dimensions are rarely precise. Therefore, shims are employed to attain proper alignment therebetween during assembly. This complicates the assembly and is time consuming. It is a further object of this invention to provide interconnecting means and a method for assembling the body to the frame wherein dimensional variations within the usual manufacturing tolerances between frame and body do not require precise alignment and thus substantially eliminates the attendant assembly line difficulties.

This invention contemplates employment of a wide frame wherein an intermediate portion between front and rear wheels of the vehicle is offset outwardly from forward and rearward narrower frame portions to a position adjacent to the body sills. While the body to frame mounting means and method of assembly advocated by this invention are adaptable to numerous versions of wide frames, it is particularly suited to the frame shown and described in the copending application Serial No. 713,177, filed February 4, 1958, and now Patent No. 2,964,331, by the same inventor as this application wherein the floor may be lowered to the level of minimum ground clearance between the intermediate portions of the frame side rails extending generally from the toe board to the front edge of the rear seat to provide adequate and comfortable seating together with a low silhouette.

According to the invention, a vehicle body having side sills intermediate its length and extending generally between the front and rear wheel houses is to be assembled to a frame having a portion intermediate its length and extending rearwardly from the dash area outwardly offset from forward and rearward narrower portions to a position generally adjacent to the sills of the body. The frame is provided with conventional horizontal mounting surfaces at the dash and at the rear thereof as preliminary rest points for the body at assembly and is adapted to receive a conventional vertical mounting assembly. Only the front or dash vertical mounting between the frame and body need be accurately positioned so as to control alignment of radiator, steering gear, and engine mounting surfaces in relation to the body. All other body-to-frame interconnecting means comprise horizontal members which extend through the frame and engage the body sill or side panels and are welded respectively to the body and frame to achieve a high degree of rigidity in the frame to body connection wherein deflection of body relative to frame is substantially eliminated.

With horizontal all-metal interconnecting means between frame and body, the high rigidity may produce a vehicle giving the impression of a "harsh" or "nervous" ride as though the tires were over-inflated. It may be that some or even all of this harshness can be removed in the design of a suitable suspension system.

If desired, the interconnecting means may be rubber insulated and comprise an elongated tubular member which extends through the frame and is welded to the vertical wall of the body sill or vertical wheel house panel depending on its location relative to the body. A rubber bushing is disposed around the tubular member and is enclosed in a collar which is fixedly secured to the frame. This interconnection between frame and body permits some deflection therebetween, but for all practical purposes the deflection will occur only in the rubber bushing, a medium having high damping value to suppress vibrations and road noise. Rubber of a given resilience may be selected to control the amount of deflection between frame and body and to obtain the damping characteristics desired.

In the process of assembling and securing the body to the frame utilizing the horizontal body mounts, the mounts are first assembled loosely to the frame and disposed inwardly so as to be cleared by the body. The body is then brought into position and secured at the preliminary rest points. The horizontal mounts are then moved outwardly relative to the frame to engage the body sills or wheel house panels, depending on the location of the mount relative to body length. Each mount is then welded to the body and to the frame respectively to complete the assembly.

The accompanying drawings illustrate the best mode presently contemplated for carrying out the invention.

In the drawings:

FIG. 5 is an enlarged sectional view taken on line 5—5 of FIG. 2 and additionally shows a portion of the body floor panel in phantom lines;

FIG. 6 is a sectional view similar to that of FIG. 5 and shows one of the tubular connecting means of this invention assembled to the frame and moved to an inward position clear of the body;

FIG. 7 is a view taken on line 7—7 of FIG. 5;

FIG. 8 is an enlarged view partially in section showing a rubber insulated tubular connector secured between frame and body; and FIG. 9 is a detail view of one of the split flat washers whereby the tubular connectors are secured to the frame rail.

Figure 1:
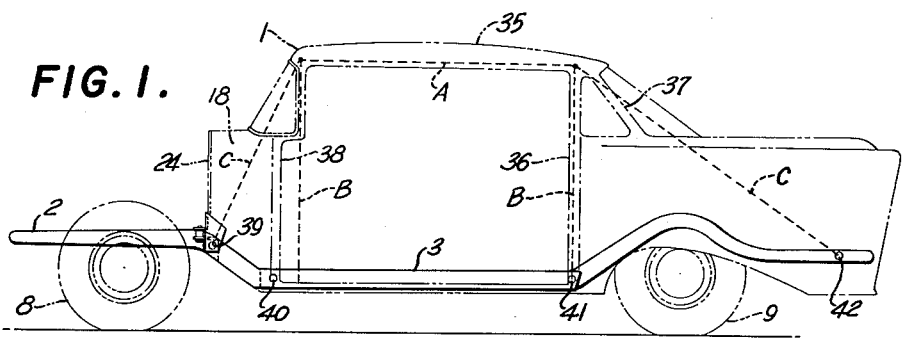
FIGURE 1 is a side elevation of a vehicle chassis including a wide frame with the body skeleton shown in phantom lines mounted thereon.

Referring to the drawings, a portion of a vehicle skeletal body 1, shown in dot-dash lines, is mounted to a frame 2 comprising a pair of transversely spaced side rails 3 connected by front and rear crossbar assemblies 4 and 5. Each side rail 3 includes a forward portion 6 and a rearward portion 7 disposed inboardly from the front and rear wheels 8 and 9, respectively and an intermediate portion 10 which is offset outwardly from the forward and rearward portions to a location inboardly from and closely adjacent the body side sills 11. The frame 2 is commonly termed a wide or offset frame and permits lowering of the body floor 12 within the central portion of the frame generally in the area corresponding to the intermediate portion 10 to provide adequate and comfortable seating together with a low vehicle silhouette.

According to the invention, the skeletal body 1 is mounted to the frame 2 principally by means of transversely extending tubular body mounts 13 welded respectively to the frame and body and shown most clearly in FIGURES 5–6. The body mounts 13 each include an elongated tubular member 14 provided with an end flange 15. The lower portion of end flange 15 is provided with an outwardly offset lip 16 which will assure a linear engagement with the body either at the sill 11, rear wheelhouse 17, or cowling panel 18, depending on the location of the body mount 13 relative to the body. The length of tubular members 14 should be such that when the lip 16 engages the body it will extend through the horizontally and transversely aligned openings 19 and 20 provided respectively in an outwardly disposed portion of side rail 3 an an inner frame portion 21 spaced inwardly therefrom. The inner frame portion 21 may variously be bracket means such as shown at 22 adjacent the rear crossbar 5 in FIG. 2 or an inwardly disposed side rail portion which longitudinally overlaps the outwardly disposed portion containing opening 19 depending on the location of the particular body mount in the frame structure 2.

Prior to the assembly of the body to the frame, the body mounts 13 are assembled to the frame and pushed well inwardly as shown in FIG. 6 to provide ample clearance for body assembly. The body is then lowered onto the frame and aligned with the forward transversely spaced preliminary rest points 23 providing horizontal mounting surfaces for the body at the dash cowling panel 24. Conventional vertically extending mounting means 25 extend through vertically aligned holes through body and frame to secure them together at rest points 23 providing proper alignment therebetween for radiator, steering gear and engine mounting. The rear crossbar 5 provides the transversely spaced rearward preliminary rest points at 26. Conventional vertical mounting means 25 are also utilized at 26 but are not shown and extend through vertically aligned holes through body and frame to secure them together.

After the body has been properly positioned relative to the frame and secured at fore and aft rest points 23 and 26 with conventional body mounting means, the horizontal mounts 13 are pushed outwardly to place the offset lip 16 of end flange 15 into engagement with the body, no particular alignment therebetween being required. And while the space between the frame and adjacent body portion may vary a considerable amount as between different frame and body assemblies, the aligned openings 18 and 19 permit horizontal adjustment of mounts 13 to overcome the space tolerance variations. The weld 27 secures lip 16 to the body and provides a pure shear connection therebetween. The tubular member 14 is then secured respectively to inner frame portion 21 and to the outer portion of side rail 3 by means of welds 28. The assembly with horizontal mounts 13 provides a relatively rigid connection between frame and body wherein deflection therebetween is substantially eliminated.

According to another embodiment of the invention shown in FIG. 8, a rubber bushing 29 is disposed around tubular member 14 and is confined by the annular collar 30. In the assembled position of the body mount 13 between frame and body, bushing 29 and collar 30 extend through the opening 19 in side rail 3 with some clearance being permitted between the collar and frame.

A flexible adaptor plate or washer 31 is disposed on collar 30 outwardly of side rail 3. The washer is undersize of collar 30 and as shown in FIG. 9 is split at 32 in the lower portion thereof providing ease of assembly on the collar and yet assuring a tight fit therebetween. A pair of weld projections 33 are provided oppositely from the split 32 in the upper portion of the washer. In assembly the washer 31 is projection welded to the frame prior to the assembly of the horizontal mounts 13.

The horizontal mounts of FIG. 8 are loosely assembled to the frame in a manner similar to the mounts of FIGS. 5 and 6 providing ample clearance for body assembly. After the body is brought into place and secured at the preliminary rest points 23 and 26, the mounts are pushed outwardly to place the offset lip 16 into engagement with the adjacent body portion and weld 27 is deposited therebetween to provide a shear connection. Next the opposite end of tubular member 14 is secured to the inner frame portion 21 by means of the weld 28. After the tubular member has been secured between frame portion 21 and the body, the washer 31 is secured to the frame and the split therein united by a final weld 34 between the bottom of the washer and the frame.

With the rubber bushing 29, some deflection is permitted between frame and body, but such deflection will occur only in the rubber bushing which has a high damping value, thus achieving the feel of softness coupled with rapid absorption of vibrations. The rubber further acts to reduce road noise.

In the past, conventional mounts 25 connecting frame and body were empirically located to get the best side results heretofore attainable. According to this invention it is further proposed that in order for frame and body to participate more fully and function together in supplying structural strength and rigidity to resist vertical bending forces and twisting forces, the body mounts 13 be strategically located in accordance with the analogy shown in FIG. 1.

According to FIG. 1, the body skeleton 1 may for purposes of analogy be likened to a truss structure secured to the supporting frame wherein the roof 35 serves as the connecting strut A. In the rearward portion of the vehicle, the body rear door post framing member 36 and rear window frame 37 together with the wheelhouse panel 17 serve as the vertical and angular truss members B and C respectively. Forwardly the body front door-post framing 38 together with the side cowling panel 18 serve as similar vertical and angular truss members B and C. For the frame to gain the full strength and rigidity contribution of the body, the tubular body mounts 13 should connect frame and body where the vertical truss members B and angular truss members C intercept the frame. It will be apparent from FIG. 1, however, that material distribution in the body does not permit connection between frame and body in accordance to a pure truss. In order to approach the pure truss as nearly as material distribution permits, it is proposed that body mounts 13 make their connection between body and frame at 39, a location generally in line with the dash panel 24, at 40, a location generally in line with the front doorpost framing member 38, at 41, a location generally in line with the rear doorpost framing member 36, and at 42 adjacent the rear end of the frame. Additional connections between frame and body may be utilized to reduce local movements between frame and body, as for example in the long span between locations 40 and 41, but it has generally been found to be unnecessary. If it is found to be desirable to provide an additional connection between locations 40 and 41, it logically should be placed to provide optimum support for the front seat, not shown, for additional contribution of the body toward the structural strength and rigidity of the frame and body combination.

Figure 2:
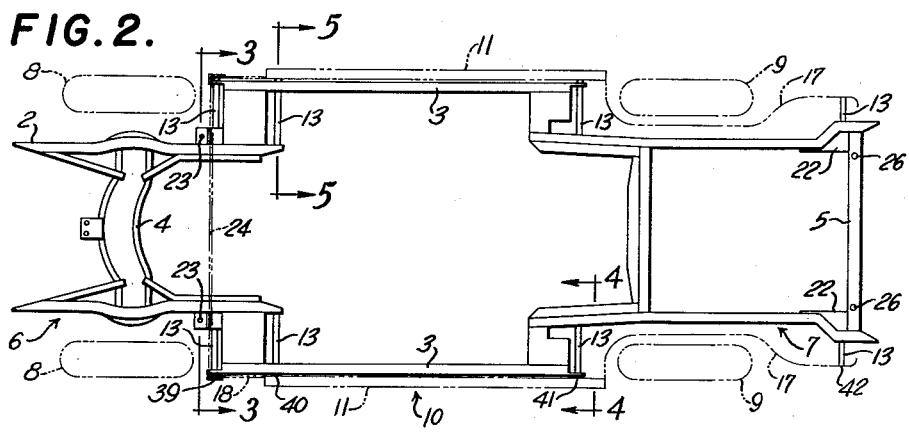
FIG. 2 is a plan view of a wide frame with the lower portions of the vehicle body skeleton indicated and shows the attachment therebetween.
Figures 3, 4:
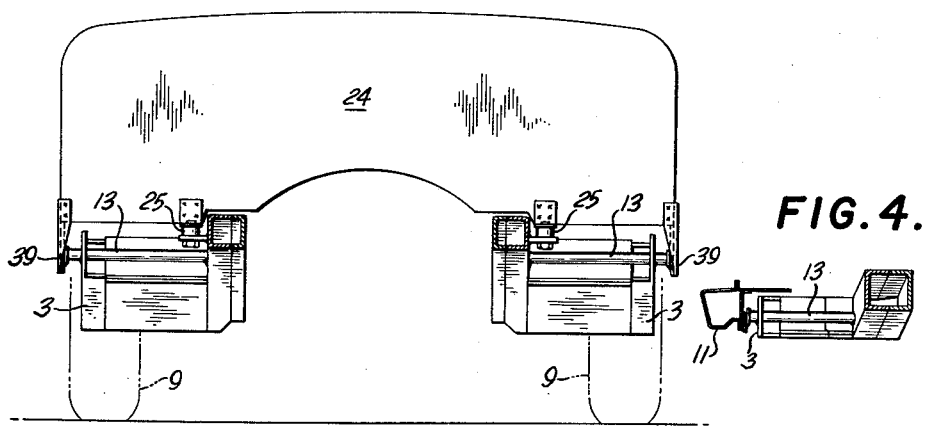
FIG. 3 is an enlarged view taken on line 3—3 of FIG. 2 and shows the attachment between frame and body in the dash area.
FIG. 4 is an enlarged view taken on line 4—4 of FIG. 2 and shows the attachment between frame and body forwardly of the rear wheelhouse.

Considered as a conventional beam with loads applied directly thereto, the wide or offset frame cannot be as efficient as a straight frame because the offsets tend to act as cranks subjecting the frame rails to twisting forces which reduce their carrying ability. While the frame portions can be economically proportioned to resist torsional deflection of the forward and rearward frame portions 6 and 7 under the influence of loads applied to the offset intermediate portion 10, the offset frame utilizes the body itself through the mounting means and their location to still further minimize the torsional deflection. Referring to FIGURES 1 and 2, note that to each side of the frame centerline a conventional body mount 25 and a tubular body mount 13 provide a wide purchase attachment at the dash line. The large transverse dash panel 24 thus serves to stabilize the offset or crank and effectively supports the loads on the intermediate frame portions 10 at the forward end of the side rails 3. In most instances, the dash panel 24 serves so effectively as a rigid cross member for the frame that a frame cross member in the area of the dash line is unnecessary. The body wheelhouse panel 17 is similarly utilized at the rear offset.

The invention thus provides novel mounting means for supporting the body of a vehicle to its frame and proposes strategic placement of such means to attain maximum structural efficiency between frame and body. The invention further provides mounting means and a method of assembly wherein dimensional variations within the usual manufacturing tolerances between frame and body do not require precise alignment and thus substantially eliminates some of the current assembly line difficulties.

Various modes of carrying out the invention are contemplated as being within the scope of the following claims particularly pointing out and distinctly claiming the subject matter which is regarded as the invention.

I claim:

1. In combination, a vehicle frame including transversely spaced inner and outer vertical frame portions provided with transversely aligned openings, a body for support on said frame and having a vertically extending portion spaced outwardly of said outer frame portion and positioned substantially opposite the opening therein, and a transversely extending connecting member extending through the frame openings and engaging the opposed body portion and being secured respectively to the frame and vertically disposed body portion, said openings providing for slidable transverse adjustment of the connecting member prior to securement to overcome the space tolerance differences between the body and frame.

2. The combination set forth in claim 1 wherein the securements for attaching the connecting member to the frame and body respectively, are welds, said connecting member together with the welds providing a relatively rigid connection between frame and body wherein deflection therebetween is substantially eliminated.

3. In combination with a vehicle frame having a transverse opening therein, a body for support on said frame and having a vertically extending portion spaced outwardly of said frame and positioned substantially opposite said opening, and a horizontal transversely extending connecting member extending through the frame opening and adapted to be secured respectively to the frame and the vertically disposed body portion, said connecting member being provided with a flange at the outer end thereof and the lower portion of the flange being offset outwardly to make contact with the body, said opening providing for slidable horizontal adjustment of the connecting member prior to its securement to overcome the space tolerance differences between the body and frame.

4. The combination set forth in claim 1 wherein the securement between the body and connecting member is a weld providing a substantially rigid shear joint therebetween.

5. The combination set forth in claim 1 wherein the connecting member comprises a tubular member, a resilient bushing mounted on the tubular member, and an annular sleeve mounted on the tubular member outwardly of said bushing to confine the bushing, said sleeve extending through the outer frame opening and being secured relative to the frame, said resilient bushing providing for limited movement between the frame and body and serving to dampen such movements.

6. In combination, a vehicle frame including transversely spaced inner and outer vertical frame portions provided with transversely aligned openings at spaced intervals longitudinally of the frame, a body for support on said frame and having vertically extending portions spaced outwardly of said outer frame portions and positioned opposite the openings therein, and a transversely extending connecting member extending through the respective aligned frame openings and engaging the opposed body portions and welded respectively to the frame and vertically disposed body portions, said connecting members being disposed generally at the dash line, the front door post, the rear door post, and the rear end of said frame.

7. In combination, a vehicle frame including transversely spaced inner and outer frame portions with the outer portion having a transverse opening therein, a body for support on said frame and having a vertically extending portion outwardly of the outer frame portion in alignment with said opening, a tubular member, a resilient bushing mounted on said tubular member, an annular sleeve mounted on the bushing to confine the bushing on the tubular member, said tubular member, bushing, and sleeve extending through said opening in the outer frame portion with the tubular member engaging respectively the vertically disposed body portion and the inner frame portion, a washer disposed relatively tightly on said sleeve and in engagement with the outer frame portion, welds securing the ends of the tubular member to the body portion and the inner frame portion respectively, and weld means securing said washer to the outer frame portion and thereby securing the sleeve within the opening and relative to the outer frame portion.

8. The combination set forth in claim 7 wherein the outer end of the tubular member is provided with a flange and the lower portion of the flange is offset outwardly to make contact with the body.

9. The combination set forth in claim 7 wherein the washer is made undersize of the sleeve to assure relative tightness thereon and is split to provide flexibility for assembly on the sleeve and the weld means secures the split portions of the washer relative to each other and relative to the frame.

10. In combination with a vehicle frame including transversely spaced inner and outer frame portions and a body for support on said frame and having vertically extending portions spaced outwardly of the outer frame portions, connecting means for mounting the body to said frame and comprising, a tubular member extending horizontally through an opening in said outer frame portion and spaced from said opening and engaging respectively the body portion and the inner frame portion, an annular resilient bushing mounted on said tubular member and extending through said opening, an annular sleeve mounted on the bushing to confine the bushing on the tubular member and having clearance with said opening, a washer disposed relatively tightly on said sleeve and in engagement with the outer frame portion, welds securing the ends of the tubular member to the body portion and the inner frame portion respectively, and weld means securing said washer to the outer frame portion and thereby securing the sleeve relative to the opening and outer frame portion, said connecting means being provided to each side of frame centerline and disposed generally at the dash line, the front doorpost, the rear doorpost, and the rear end of said frame.

11. Mounting means for connecting a vehicle body to a frame, said frame having a transverse opening therein and said body including a vertically extending portion disposed outwardly of the frame and opposite from the frame opening, said mounting means comprising an elongated member extending transversely through the frame opening and engaging the vertically extending body portion and adapted to be welded respectively to the body portion and frame, the outer end of the elongated member being provided with a flange and the lower portion of the flange being offset outwardly and adapted to make contact with the body.

12. Mounting means for connecting a vehicle body to a frame, said frame including inner and outer spaced frame portions and said body having a vertically extending portion spaced outwardly of said frame, comprising a tubular member, an annular resilient bushing mounted on a portion of said member, an annular sleeve mounted on said bushing to confine the bushing on said tubular member, and a washer disposed on said sleeve, said member being made undersize of the sleeve to assure relative tightness thereon and being split to provide flexibility for assembly thereto, said mounting means being adapted to extend through transversely and horizontally aligned openings provided in the spaced frame portions with the bushing and sleeve disposed in clearance relation within the opening in the outer frame portion when the outer end of said tubular member engages the vertical body portion, the outer end of said tubular member being provided with a flange having a lower outwardly offset lip to assure engagement between the lip and the vertical body portion for welding, and said tubular member being further adapted for welding to the inner frame portion, and said washer being adapted to have the split portions thereof secured relative to each other and relative to the outer frame portion by welding.

13. In the assembly of a vehicle body to a frame, said body including a transversely extending dash panel at the dash line and said frame including a pair of transversely spaced side rails, each of said side rails providing inner and outer spaced frame portions at the dash line, a horizontal mounting surface provided adjacent each inner frame portion substantially at the line of dash, horizontal mounting projections corresponding to the frame mounting surfaces extending from the body dash panel, vertically extending mounting means securing the mounting projections to the mounting surfaces to provide a pair of inwardly disposed connections between the dash panel and the frame, vertical mounting surfaces extending from the dash panel outwardly of the outer frame portions, and horizontal and transversely extending mounting means disposed generally at the line of dash and connecting the vertical mounting surfaces to the corresponding outer frame portions, said horizontal and vertical mounting means providing a wide purchase attachment to each side of the longitudinal centerline of the frame whereby the dash panel serves as a cross bar to enhance the strength and rigidity of the frame.

14. In the assembly of a vehicle body to a frame, said body including a transversely extending dash panel at the dash line and said frame including a pair of transversely spaced side rails, horizontal mounting surfaces provided on the frame at the line of dash and adjacent the end thereof, horizontal mounting surfaces provided on said body and corresponding to the frame mounting surfaces, vertically extending mounting means securing the corresponding horizontal mounting surfaces together to align the body to the frame and provide for partial securement therebetween, vertical mounting surfaces provided on said body and spaced outwardly from the frame between the dash line and the end of the frame, and horizontal and transversely extending mounting means connecting the vertical body mounting surfaces to the frame at the line of dash and at the end of the frame and at preselected locations therebetween to complete the body to frame securement.

15. In the assembly of a vehicle body to a frame, said body including a transversely extending dash panel at the dash line and said frame including a pair of transversely spaced side rails each having inner and outer spaced frame portions at the dash line and the rear end of the frame and at preselected locations therebetween with apertures being provided in the outer frame portion at said locations, horizontal mounting surfaces provided on the frame adjacent the inner frame portion at the line of dash and at the end of said frame, horizontal mounting surfaces provided on said body and corresponding to the horizontal mounting surfaces on said frame, vertically extending mounting means securing the corresponding horizontal mounting surfaces on frame and body together to align the body to the frame and provide for partial securement therebetween, vertical mounting surfaces provided on said body and spaced outwardly of said side rails opposite the frame apertures, horizontal and transversely extending mounting means extending through the frame apertures and engaging respectively the vertical mounting surfaces on said body and the inner frame portions, and welds securing the horizontal mounting means to the body and spaced frame portions to complete the body to frame securement.

References Cited in the file of this patent

UNITED STATES PATENTS

| | | |
|---|---|---|
| 1,808,560 | Ledwinka | June 2, 1931 |
| 1,832,845 | Grimm | Nov. 24, 1931 |
| 2,520,074 | Wernig et al. | Aug. 22, 1950 |
| 2,544,525 | Cadwallader | Mar. 6, 1951 |
| 2,551,528 | Darrin | May 1, 1951 |

FOREIGN PATENTS

| | | |
|---|---|---|
| 674,561 | France | Oct. 22, 1929 |